(12) United States Patent
Keusenkothen et al.

(10) Patent No.: US 12,151,223 B2
(45) Date of Patent: Nov. 26, 2024

(54) ATOMIZATION AND PYROLYSIS OF RESID CRACKING FEED

(71) Applicant: ExxonMobil Chemical Patents Inc., Baytown, TX (US)

(72) Inventors: Paul F. Keusenkothen, Houston, TX (US); Zachary D. Young, Houston, TX (US); Mohsen N. Harandi, Calgary (CA)

(73) Assignee: ExxonMobil Chemical Patents Inc., Baytown, TX (US)

( * ) Notice: Subject to any disclaimer, the term of this patent is extended or adjusted under 35 U.S.C. 154(b) by 262 days.

(21) Appl. No.: 17/627,060

(22) PCT Filed: Jun. 17, 2020

(86) PCT No.: PCT/US2020/038078
§ 371 (c)(1),
(2) Date: Jan. 13, 2022

(87) PCT Pub. No.: WO2021/011142
PCT Pub. Date: Jan. 21, 2021

(65) Prior Publication Data
US 2022/0274081 A1    Sep. 1, 2022

Related U.S. Application Data

(60) Provisional application No. 62/875,674, filed on Jul. 18, 2019.

(51) Int. Cl.
*C10G 9/28* (2006.01)
*B01J 6/00* (2006.01)
(Continued)

(52) U.S. Cl.
CPC ............. *B01J 12/005* (2013.01); *B01J 6/008* (2013.01); *B01J 19/26* (2013.01); *C10G 9/28* (2013.01); *B01J 2219/00159* (2013.01)

(58) Field of Classification Search
None
See application file for complete search history.

(56) References Cited

U.S. PATENT DOCUMENTS

| 2,526,696 A | 10/1950 | Schutte | 196/55 |
| 2,541,693 A | 2/1951 | Frevel et al. | 260/683 |

(Continued)

FOREIGN PATENT DOCUMENTS

WO    WO2018/211531    11/2018

OTHER PUBLICATIONS

Zirasefi et al. Improvement of the Thermal Cracking Product Quality of Heavy Vacuum Residue Using Solvent Deasphalting Pretreatment. Energy & Fuels, 2016, 30, 10322-10329 (Year: 2016).*

*Primary Examiner* — In Suk C Bullock
*Assistant Examiner* — Alyssa L Cepluch

(57) ABSTRACT

A method and apparatus for conversion of petroleum resid fluid through atomization and pyrolysis, including: generating a stream of atomized resid fluid; and delivering the stream to a plurality of cracking particles, wherein the cracking particles have a temperature from 700° C. to 1200° C. when the stream is delivered. Generating the stream of atomized resid fluid may include: delivering heated resid fluid to a nozzle; and delivering diluent fluid to the nozzle. A method and apparatus includes: a first multi-phase fluid application device configured to generate a first stream of atomized resid fluid; a port configured to guide a plurality of cracking particles to intersect the first stream; and a particle heating component configured to heat the cracking particles before the particles intersect the first stream.

15 Claims, 3 Drawing Sheets

(51) Int. Cl.
    *B01J 12/00*     (2006.01)
    *B01J 19/26*     (2006.01)

(56) References Cited

U.S. PATENT DOCUMENTS

| | | | |
|---|---|---|---|
| 2,692,225 A | 10/1954 | Findlay | 196/55 |
| 2,692,226 A | 10/1954 | Smith | 196/75 |
| 3,408,007 A | 10/1968 | Raichle et al. | 239/132 |
| 4,919,898 A | 4/1990 | Gartside et al. | 422/219 |
| 6,142,457 A * | 11/2000 | Holtan | B05B 7/0408 |
| | | | 261/78.2 |
| 6,352,639 B2 | 3/2002 | Ito et al. | 208/113 |
| 7,491,250 B2 | 2/2009 | Hershkowitz et al. | 48/198.7 |
| 10,562,050 B2 | 2/2020 | Find et al. | |
| 2003/0159973 A1 * | 8/2003 | Maa | C10G 9/32 |
| | | | 208/126 |
| 2006/0016726 A1 | 1/2006 | Steffens et al. | 208/113 |
| 2006/0144757 A1 * | 7/2006 | Steffens | B01J 8/1818 |
| | | | 422/139 |
| 2007/0144940 A1 | 6/2007 | Hershkowitz et al. | 208/107 |
| 2007/0191664 A1 | 8/2007 | Hershkowitz et al. | 585/539 |
| 2008/0142409 A1 | 6/2008 | Sankaranarayanan et al. | |
| | | | 208/62 |

\* cited by examiner

ATOMIZATION AND PYROLYSIS OF RESID CRACKING FEED

CROSS REFERENCE TO RELATED APPLICATIONS

This application is a national stage filing of Patent Cooperation Treaty Application No. PCT/US2020/038078 filed Jun. 17, 2020, claiming claims priority to U.S. Provisional Application No. 62/875,674, filed Jul. 18, 2019, and to EP application Ser. No. 19/196,859.3, filed Sep. 12, 2019, the disclosures of the Provisional and EP Applications are incorporated herein by reference.

FIELD

The present disclosure relates to an apparatus and a process for conversion of petroleum resid fluids through atomization and pyrolysis.

BACKGROUND

Heavy oils, including heavy crudes, reduced crudes, residual oils from distillation processes, and bitumens, are relatively low value products and unsuitable for many of the purposes for which lighter hydrocarbon products can be practically used. To exploit these materials more fully, a multiplicity of refining processes have been developed and used.

Fluid Catalytic Cracking (FCC) and Resid Catalytic Cracking (RCC or RFCC) are important conversion processes that convert high-boiling, high-molecular weight hydrocarbon fractions of petroleum crude oils into more valuable gasoline, olefinic gases, and other products. The feedstock to FCC/RCC is usually that portion of the crude oil that has an initial boiling point of 340° C. or higher at atmospheric pressure and an average molecular weight ranging from 200 g/mol to 600 g/mol or higher. In the FCC/RCC process, the feedstock is heated to a temperature range of from 495° C. to 565° C. and brought into contact with a catalyst. For example, a process using FCC/RCC catalysts may be carried out in riser reactors in which catalyst streams composed of catalyst particles and gas are brought into contact with oil and reacted. The catalyst chemically breaks the long-chain molecules of the high-boiling hydrocarbon liquids into much shorter molecules, which are collected as a vapor. The catalyst particles typically have an average particle size in the range from 60 μm to 150 μm. The reactions proceed with resid-catalyst contact times (in the riser) from 0.5 to 5 seconds.

Unlike catalytic cracking, resid steam cracking has not been successfully commercialized. Typically, resid steam cracking utilizes a nozzle having small inlet ports to generate a resid vapor. Often, the inlet ports quickly foul due to the mixed-phase resid cracking feed. The viscosity of the heavy resid feed may slow fluidized flow, and/or solids may agglomerate, thereby bogging fluidized flow.

Improved devices and methods for conversion of petroleum resid fluids are needed.

Related publications include US 2006/016726; U.S. Pat. Nos. 2,692,226; 2,541,693; 2,526,696; 3,408,007; and 4,919,898.

SUMMARY

In any embodiment a method comprises (consists of, consists essentially of) generating a stream of atomized resid fluid; and delivering the stream to a plurality of cracking particles, wherein the cracking particles have a temperature from 700° C. to 1200° C. when the stream is delivered.

In any embodiment an apparatus (consists of, consists essentially of) a first multi-phase fluid application device configured to generate a first stream of atomized resid fluid; a port configured to guide a plurality of cracking particles to intersect the first stream; and a particle heating component configured to heat the cracking particles before the particles intersect the first stream.

DETAILED DESCRIPTION

Figure 1A:
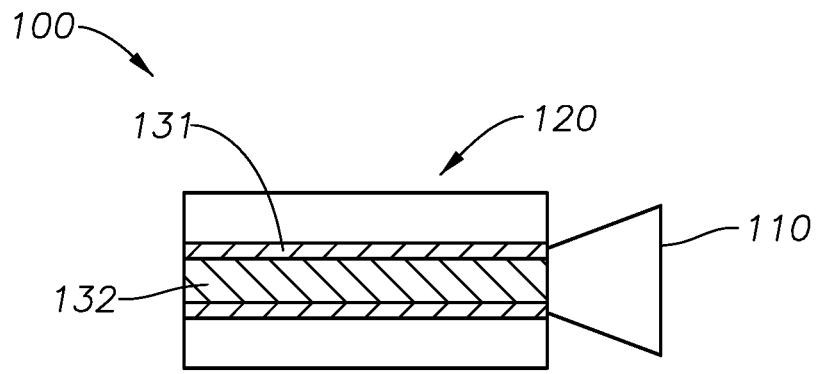
FIG. 1A illustrates an exemplary multi-phase fluid application device.

The word "exemplary" is used herein to mean "serving as an example, instance, or illustration." Any aspect described herein as "exemplary" is not necessarily to be construed as preferred or advantageous over other aspects.

The term "simultaneous" does not necessarily mean that two or more events occur at precisely the same time or over exactly the same time period. Rather, as used herein, "simultaneous" means that the two or more events occur near in time or during overlapping time periods. For example, the two or more events may be separated by a short time interval that is small compared to the duration of the overall operation. As another example, the two or more events may occur during time periods that overlap by 40% to 100% of either period.

As used herein, and unless otherwise specified, the term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon. Additionally, the hydrocarbon compound may contain, for example, heteroatoms such as sulfur, oxygen, nitrogen, or any combination thereof.

As used herein, the term "reactor" refers to equipment used for chemical conversion. As such, several items identified as reactors may be combined to become a single entity that is also identified as a reactor, in that individual and combined entities may be characterized as equipment used for chemical conversion.

A pyrolysis reactor refers to equipment for converting hydrocarbons by means of at least pyrolysis chemistry. The pyrolysis reactor may include one or more reactors and/or associated equipment and lines. That is, in certain embodiments, the pyrolysis reactor may include at least two reactors coupled in series and in fluid communication with each other, or may include two reactor beds in series within a single reactor. Examples of such reactors include, but are not limited to, regenerative reverse-flow reactors as described in US 2007/0191664; and pyrolysis reactors as described in U.S. Pat. No. 7,491,250, US 2007/0144940 and US 2008/0142409.

Such a pyrolysis reactor involves at least pyrolysis chemistry. Pyrolysis or pyrolysis chemistry involves the conversion of hydrocarbons to unsaturates, such as ethylene and acetylene, which is an endothermic reaction requiring addition of heat. The terms "crack" and "cracking" may be used interchangeably with the terms pyrolyse and pyrolysis. In a pyrolysis reaction, >50%, >80%, or >90%, of this heat is provided by heat transfer via solid surfaces, such as tubulars or bed materials. Any combustion chemistry that occurs within the pyrolysis stream of a pyrolysis reactor provides a minority of the endothermic heat of pyrolysis, such as <50%, <20%, or <10% of the endothermic heat of pyrolysis.

The term "hydrocarbon feed" as used herein refers to any variety of hydrocarbon compounds. As used herein, the "hydrocarbon feed" contains hydrocarbons (C bound to H) and may contain (i) minor components of heteroatoms (<10 wt %) covalently bound to hydrocarbons and (ii) minor components of heteroatoms (<10 wt %) not bound to hydrocarbons (e.g., H2O), wherein these weight percents are based on the weight of the hydrocarbon feed. Reference to "hydrocarbon compounds" or "hydrocarbons in the hydrocarbon feed" or "hydrocarbons of the hydrocarbon feed" means molecules within the hydrocarbon feed that contain at least hydrogen and carbon and, optionally containing heteroatoms such as oxygen, sulfur and nitrogen. Weight percents of hydrogen and carbon, as used to characterize the hydrocarbon feed, are typically provided as a percent of the hydrocarbons in the hydrocarbon feed. Preferably, the hydrocarbon compounds are comprised of at least 75 percent (%) of both carbon and hydrogen, based on total atom content of the hydrocarbon.

The hydrocarbon feed may include, by way of non-limiting examples, one or more of Fischer-Tropsch gases, methane, methane containing streams such as coal bed methane, biogas, associated gas, natural gas and mixtures or components thereof, steam cracked gas oil and residues, gas oils, heating oil, jet fuel, diesel, kerosene, gasoline, coker naphtha, steam cracked naphtha, catalytically cracked naphtha, hydrocrackate, reformate, raffinate reformate, Fischer-Tropsch liquids, natural gasoline, distillate, virgin naphtha, crude oil, atmospheric pipestill bottoms, vacuum pipestill streams including bottoms, wide boiling range naphtha to gas oil condensates, heavy non-virgin hydrocarbon streams from refineries, vacuum gas oils, heavy gas oil, naphtha contaminated with crude, synthetic crudes, shale oils, coal liquefaction products, coal tars, tars, atmospheric resid, heavy residuum, C4's/residue admixture, naphtha residue admixture, cracked feedstock, coker distillate streams, plastics, hydrocarbon streams derived from plant or animal matter, and any mixtures thereof.

The term "hydrocarbon co-feed" generally refers to a co-feed that contains one or more hydrocarbon compounds. The term "fluid hydrocarbon co-feed" refers to a hydrocarbon feed that is not in a solid state. The fluid hydrocarbon co-feed can be a liquid hydrocarbon co-feed, a gaseous hydrocarbon co-feed, or a mixture thereof. Also, the fluid hydrocarbon co-feed can be fed to a catalytic cracking reactor in a liquid state, and/or in a gaseous state, or in a partially liquid-partially gaseous state. When injected into the catalytic cracking reactor in a liquid state, and/or in a gaseous state, or in a partially liquid-partially gaseous state, the fluid hydrocarbon co-feed may be vaporized upon entry, such as the fluid hydrocarbon co-feed may be contacted in the gaseous state with the FCC catalyst. A hydrocarbon co-feed can be a petroleum oil or petroleum oil component.

The term "cracked product(s)" refers to product(s) obtained after processing/cracking/breaking down heavy hydrocarbon molecules (usually nonvolatile) into lighter molecules (such as light oils (corresponding to gasoline), middle-range oils used in diesel fuel, residual heavy oils, a solid carbonaceous product known as coke, and such gases as methane, ethane, ethylene, propane, propylene, and butylene) by means of heat, pressure, and/or catalysts in a refinery reactor unit, such as an FCC reactor unit.

One of the many advantages of the embodiments of the present disclosure is that residua feedstock may be delivered by an atomization apparatus that reduces bogging and/or feed inlet fouling. For example, the atomization apparatus may avoid fouling by having a high diluent ratio, and/or by heating the residua feedstock to a temperature that provides a low stickiness factor.

The term petroleum "residua" (also referred to as "resid," "resid fluid," or "resids") generally refers to a hydrocarbon feed that contains non-volatiles (e.g., asphaltenes, metals, solids). Often, petroleum residua are frequently obtained after removal of distillates from crude feedstocks under vacuum. For example, a resid feed may include such feedstock as plastic, crude oil, and/or bio oil. Typically, resids include components of large molecular weight, generally containing: (a) asphaltenes and other high molecular weight aromatic structures that would inhibit the rate of hydrotreating/hydrocracking and cause catalyst deactivation; (b) metal contaminants occurring naturally in the crude or resulting from prior treatment of the crude that would tend to deactivate hydrocracking catalysts and interfere with catalyst regeneration; and (c) a relatively high content of sulfur and nitrogen compounds that give rise to objectionable quantities of $SO_2$, $SO_3$, and $NO_x$ upon combustion of the petroleum resid. Nitrogen compounds present in the resid also have a tendency to deactivate catalytic cracking catalysts.

FIG. 1A illustrates an exemplary multi-phase fluid application device 100. Multi-phase fluid application device 100 may be configured to simultaneously deliver (e.g., spray) two or more fluids (e.g., two or more distinct types of fluids and/or two or more distinct fluid phases). For example, as illustrated, multi-phase fluid application device 100 includes a housing 120 for two concentric fluid conduits 131, 132. As a further example, central fluid conduit 132 may have an internal diameter of from 25 μm to 75 μm. As a further example, central fluid conduit 132 may have a length of from 15 cm to 45 cm. As a further example, annular fluid conduit 131 may have an outer diameter of from 0.25 inch to 0.75 inch. As a further example, annular fluid conduit 131 may have an internal diameter of from 1300 mm to 1500 mm. As a further example, annular fluid conduit 131 may have a length of from 15 cm to 45 cm. In some embodiments (not shown), multi-phase fluid application device 100 includes two or more fluid conduits, any of which may or may not be concentric.

Multi-phase fluid application device 100 also includes a nozzle 110. For example, nozzle 110 may be a two-phase nozzle, a three-phase nozzle, a capillary nozzle, or an FCC spray nozzle. Nozzle 110 may include an atomization tip (e.g., a gas-atomizing tip capable of shearing a liquid feedstock into very small particles, reducing surface tension, and/or increasing the number of drops in a given area). In some embodiments, nozzle 110 may be configured to deliver a stream (e.g., narrow, focused, convergent, divergent, pulsing, intermittent, jet, etc.) of two or more fluids (e.g., a resid and a diluent). In some embodiments, the two or more fluids (e.g., feedstocks) may be delivered to nozzle 110 by fluid conduits (e.g., concentric fluid conduits 131, 132) in housing 120. In some embodiments, one or more fluids (e.g., fluid hydrocarbon co-feed) may additionally or alternatively be delivered to nozzle 110 to generate an atomization fluid. In some embodiments, nozzle 110 may be configured to deliver a stream having a mean atomized drop diameter of from 3 µm to 50 µm, or from 10 µm to 25 µm. In some embodiments, the nozzle may be configured to generate a stream of atomized resid droplets of selected sizes. For example, the initial size of the droplets may depend upon configuration factors such as the viscosity of the liquid, the temperature of the atomization fluid, the shear angle between the atomization fluid and the liquid, and/or the shear rate between the atomization fluid and the liquid.

Figure 1B:
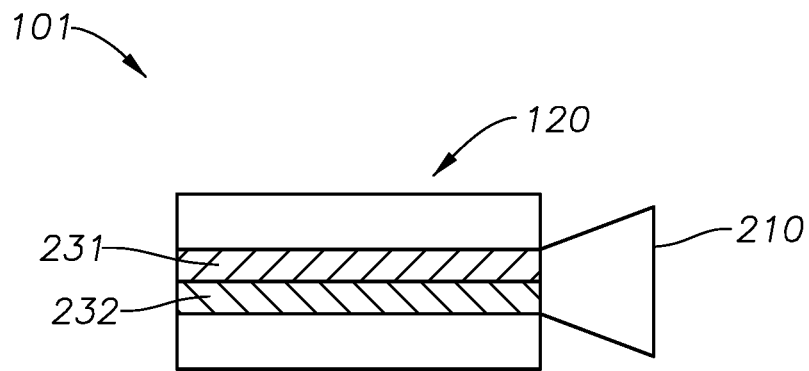
FIG. 1B illustrates another exemplary multi-phase fluid application device.

FIG. 1B illustrates another exemplary multi-phase fluid application device 101. Multi-phase fluid application device 101 may be configured similarly to multi-phase fluid application device 100, with the exception that the two fluid conduits are adjacent, rather than concentric. Specifically, FIG. 1B shows fluid conduit 231 adjacent to fluid conduit 232 in body 120. Multi-phase fluid application device 101 includes a nozzle 210, which may be configured similarly to nozzle 110, with the exception that the two or more fluids (e.g., feedstocks) may be delivered to nozzle 210 by fluid conduits (e.g., adjacent fluid conduits 231, 232) that are adjacent, rather than concentric. It should be appreciated that multi-phase fluid application device 100 and multi-phase fluid application device 101 may be used interchangeably in disclosed embodiments. Moreover, it should be appreciated that suitable multi-phase fluid application devices may include housings, fluid conduits, and nozzles having a variety of configurations, each configured to generate a stream of atomized resid droplets of selected sizes.

As illustrated, multi-phase fluid application device 100 is configured to transport two fluids separately (e.g., through fluid conduits 131, 132) through housing 120 to nozzle 110, where the two fluids are combined (e.g., mixed, emulsified, etc.). In some embodiments (not shown), the fluids may combine in housing 120 prior to reaching nozzle 110. In some embodiments (e.g., as in FIG. 1A), nozzle 110 may be configured to retain separation between the two (or more) fluids during some or all of the delivery of the fluid. In some embodiments (not shown), multi-phase fluid application device 100 may include valves, timing devices, actuators, filters, paddles, perforated conduits, etc., to more precisely control when, where, and how the two or more fluids are combined.

Multi-phase fluid application device 100 may also include one or more heating components (e.g., a heat exchanger; not shown). For example, a heating component may be associated with central fluid conduit 132 to heat the fluid transported therethrough. In some embodiments, central conduit 132 may be configured to promote and/or control heating of the fluid transported therethrough, such as being made of metal or ceramic materials. As another example, a heating component may be associated with annular fluid conduit 131 to heat the fluid transported therethrough. As another example, a heating component may be associated with nozzle 110 to heat the fluid during combining and/or delivery of the fluids. In some embodiments, nozzle 110 may be configured to operate at high temperatures, such as from 700° C. to 1000° C. As another example, a heating component may be associated with housing 120 to heat the fluid prior to combining. Any one or more of such heating components may include sensors, actuators, thermostats, device controllers, etc., to allow precision in heating timing, location, and/or temperature of the various components of multi-phase fluid application device 100 and/or fluids delivered thereby.

In some embodiments, multi-phase fluid application device 100 is configured to atomize a fluid containing petroleum residua. For example, a resid cracking feed may contain hydrocarbons, such as whole crude to vacuum resid. As another example, a resid cracking feed may contain an asphaltene or ash content from 500 ppm to 30 wt %. As another example, a resid cracking feed may contain hydrocarbons having a Conradson carbon residue (CCR) from 1% to 20%. In some embodiments, multi-phase fluid application device 100 may combine the resid cracking feed with a diluent, either as an atomization fluid or as a second feedstock. For example, a diluent may contain an inert gas (such as $N_2$), steam, etc. In some embodiments, the resid cracking feed may be heated from 50° C. to 300° C. prior to reaching nozzle 110. In some embodiments, and at some times (e.g., prior to heating) the resid cracking feed may have a kinematic viscosity from 1 centistokes to 500 centistokes, such as from 3 centistokes to 10 centistokes. In some embodiments, nozzle 110 may deliver from 0.5 g/min to 10 g/min resid cracking feed and a total diluent rate (combined nozzle gas and gas cofeed) of 300 ml/min to 2 L/min (e.g., in a test unit). In some embodiments, nozzle 110 may deliver a diluent-to-hydrocarbon weight ratio of 0.3 to 1.0 (e.g., at production scales). Note that "atomization" refers to creation of a mist or aerosol, and does not necessarily reduce the fluids into atomic components.

Figure 2:
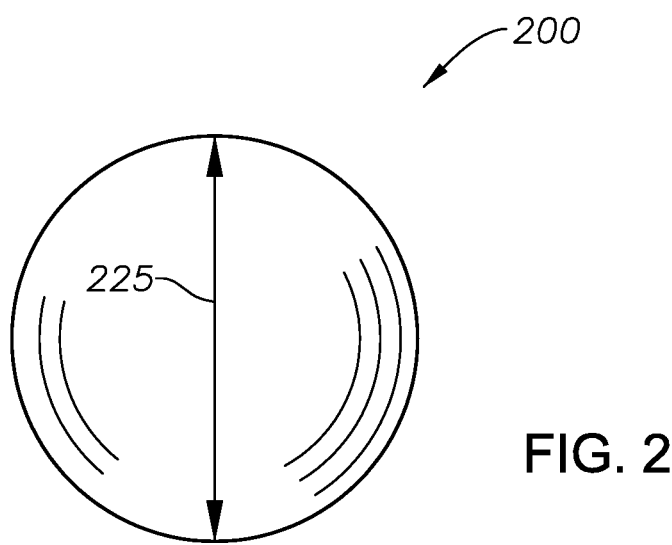
FIG. 2 illustrates an exemplary cracking particle.

FIG. 2 illustrates an exemplary cracking particle 200. For example, particle 200 may include a material having a high thermal or heat capacity (e.g., a ceramic). In some embodiments, particle 200 may be a spent and/or deactivated catalyst particle (e.g., dense alumina or spray dried alumina). As illustrated, particle 200 is a sphere, for example, having a diameter 225 of from 40 µm to 400 µm, or from 100 µm to 150 µm. It should be appreciated that particle 200 may be of a variety of three-dimensional geometric shapes, including sphere, ellipsoid, solid with concavity, irregular solid, perforated solid, etc. Without being bound by theory, it is believed that geometric shapes that provide particle 200 with a higher surface area-to-volume ratio will increase the conversion of petroleum resid fluids according to methods described herein, as compared to geometric shapes that provide a lower surface area-to-volume ratio. In some embodiments, the conversion may be close to 100% for gaseous products and/or coke precursors or tars. It should be appreciated that, when conversion is close to 100%, severity may be an important metric (e.g., the severity ratio of propylene yield over methane yield). In some embodiments, the target severity range may be from 0.2 to 1.4.

Figure 3A:
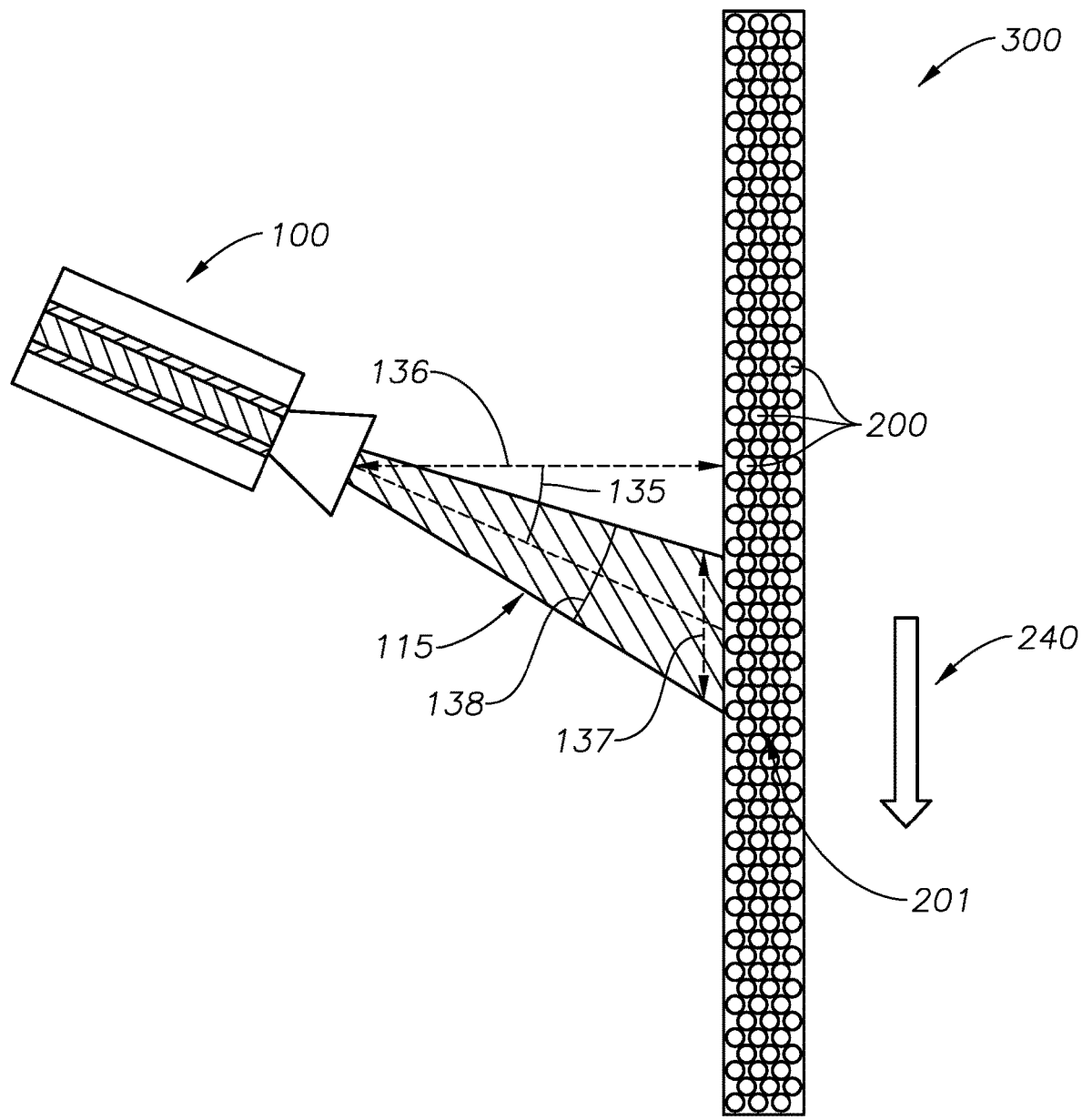
FIG. 3A illustrates an exemplary apparatus for conversion of petroleum resid fluids to one or more cracked products.

FIG. 3A illustrates an exemplary apparatus 300 for conversion of petroleum resid fluids to one or more cracked products. As illustrated, apparatus 300 includes a multi-phase fluid application device 100 and a plurality of particles 200. In the illustrated embodiment, the plurality of particles 200 are arranged to move (e.g., translationally) past multi-phase fluid application device 100 in direction 240 (e.g., falling with gravity) to receive application of multi-phased fluids delivered through multi-phase fluid application device 100 (e.g., delivered as stream 115). It should be appreciated that the plurality of particles 200 may be alternatively arranged to move translationally in a variety of fashions, for example, suspended in a tank of fluid, propelled by a column of gas, or resting on a conveyor belt. In some embodiments, plurality of particles 200 are also arranged to move rotationally (e.g., by the application of torque) while passing multi-phase fluid application device 100.

As illustrated, application of a stream 115 of multi-phase fluids by multi-phase fluid application device 100 to plurality of particles 200 creates a mixture 201 of multi-phase fluid and particles. In some embodiments (not shown), the impact of the stream 115 on the plurality of particles 200 may affect the arrangement and/or disrupt (e.g., shear) the motion of the plurality of particles 200. The impact of the stream 115 on the plurality of particles 200 may result in mixing and/or spreading-out of the particles 200. The heat energy present in the multi-phase fluid and/or the heat energy present in the plurality of particles 200 may contribute to a thermal reaction during application of the multi-phase fluids to one or more of the plurality of particles 200. The thermal reaction may vaporize the multi-phase fluid to convert petroleum residua therein to one or more cracked products. At the initial mixing temperature (e.g., 1000° C.) of the multi-phase fluid and the plurality of particles 200, the multiphase fluid may be vaporized (e.g., reacting to gaseous products), reducing the size of atomized resid droplets. It should be appreciated that more complete mixing of the atomized droplets in stream 115 with the plurality of particles 200 will produce more efficient vaporization and/or gasification resulting from cracking. Moreover, more efficient vaporization may produce less agglomeration on the particles 200 and/or fouling of components of apparatus 300.

As illustrated, multi-phase fluid application device 100 is positioned in apparatus 300 to deliver fluid (e.g., stream 115) at an angle 135 (e.g., from 0° to 90°) relative to the normal line 136 of the translational motion (e.g., direction 240) of the particles 200. The length of illustrated normal line 136 provides the distance between the nozzle 110 of multi-phase fluid application device 100 and the plurality of particles 200 (including negative distances indicative of ingress of the nozzle tip into the space occupied by the plurality of particles). For example, the length of normal line 136 may be from −0.5 cm to 10 cm, or from −0.5 cm to 0.5 cm, or from 0 cm to 5 cm, or from 5 cm to 10 cm. It should be appreciated that the configuration of the nozzle 110, the angle 135, and the distance between the nozzle 110 of multi-phase fluid application device 100 and the plurality of particles 200 may determine a width 137 (e.g., from 0.5 cm to 2 cm, or from 2 cm to 5 cm, or from 5 cm to 10 cm) of stream 115 at a location of the plurality of particles 200. Width 137 may be geometrically related to the flow angle 138 of stream 115, which may range of from 10° to 70°.

Apparatus 300 may also include a variety of additional components, such as a speed controller associated with the translational motion of the particles 200, a torque controller associated with the rotational motion of the particles 200, a position controller associated with the length of normal line 136, an aspect controller associated with the angle 135, and a flow controller associated with the volume and time-dependent flux of fluid in stream 115. In some embodiments, apparatus 300 and the associated controllers may be configured (e.g., to control the width 137 of stream 115 and/or the speed at which particles 200 pass therethrough). In some embodiments, components of apparatus 300 may be configured to adjust the rate of motion of particles 200 to maximize the heat transfer from the particles 200 to the applied multi-phase fluid. In some embodiments, components of apparatus 300 may be configured to adjust the residence time (RT) of the resulting vapor or gaseous product. For example, the RT may be representative of the time from initial mixing of the stream 115 and the particles 200 to the time of quenching of the mixture 201 of multi-phase fluid and particles. It is currently believed that vaporization may be improved with higher flow rates of multi-phase fluid, thereby improving the rate of heat transfer and maximizing the slip. For example, each particle 200 may have a RT in the stream 115 from 10 msec to 500 msec.

Figure 3B:
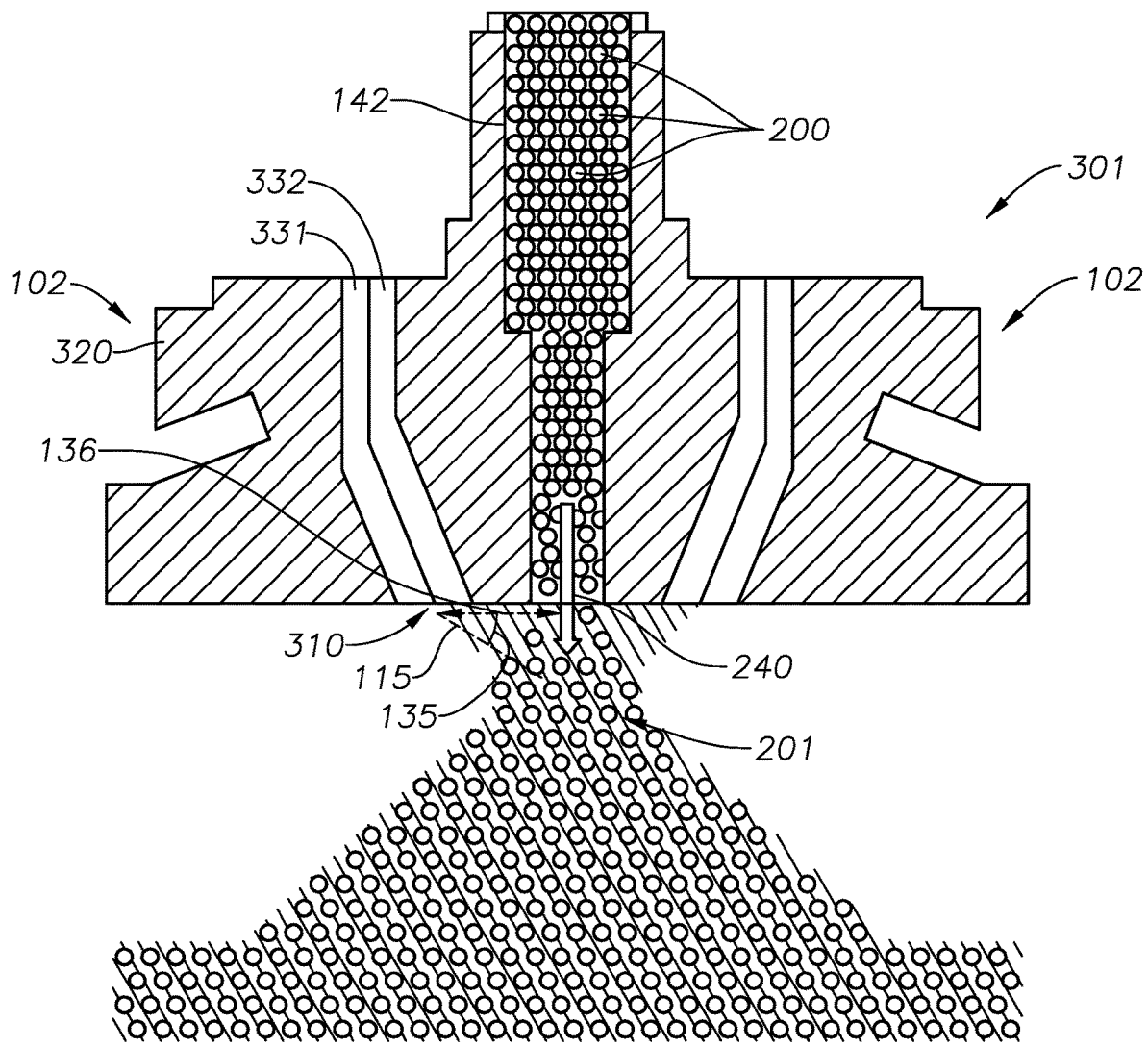
FIG. 3B illustrates an exemplary apparatus for conversion of petroleum resid fluids to one or more cracked products.

FIG. 3B illustrates in cut-away view another exemplary apparatus 301 for conversion of petroleum resid fluids to one or more cracked products. As illustrated, apparatus 301 includes a pair of multi-phase fluid application devices 102. Similar to multi-phase fluid application device 101, each multi-phase fluid application device 102 includes adjacent fluid conduits 331 and 332. As illustrated, for each multi-phase fluid application device 102, adjacent fluid conduits 331, 332 are fluidly coupled to a nozzle 310. In some embodiments, each multi-phase fluid application device 102 may deliver a diluent co-feed and a resid co-feed (e.g., solids) through nozzle 310. In some embodiments, nozzle 310 may produce atomization of the resid co-feed, generating a stream 115.

The pair of multi-phase fluid application devices 102 are illustrated sharing a common housing 320. Housing 320 includes a port 142 through which a plurality of particles 200 move in direction 240 (e.g., falling with gravity). In the illustrated embodiment, the plurality of particles 200 are arranged to move (e.g., translationally) past streams 115 from multi-phase fluid application devices 102 in direction 240, creating a mixture of multiphase fluid and particles. In some embodiments, the impact of the streams 115 on the plurality of particles 200 may affect the arrangement and/or disrupt (e.g., shear) the motion of the plurality of particles 200, resulting in mixing and/or spreading-out of the particles 200. Moreover, the heat energy present in the multi-phase fluid and/or the heat energy present in the plurality of particles 200 may contribute to a thermal reaction during application of the multi-phase fluids to one or more of the plurality of particles 200, vaporizing the multi-phase fluid to convert petroleum resid fluids therein to one or more cracked products.

As illustrated, each multi-phase fluid application device 102 is positioned in apparatus 301 to deliver fluid (e.g., stream 115) at an angle 135 (e.g., from 0° to 90°) relative to the normal line 136 of the translational motion (e.g., direction 240) of the particles 200.

In some embodiments, housing 320 may include one or more multi-phase fluid application device 102 positioned port 142. In some embodiments, the one or more multi-phase fluid application devices 102 may be positioned symmetrically port 142. In some embodiments, housing 320 may include a plurality of sub-housings (e.g., one for each multi-phase fluid application device 102) coupled together.

Apparatus 300 may also include one or more heating components (not shown). For example, a heating component may be associated with the plurality of particles 200 and/or any associated motion mechanisms. Such heating component may include sensors, actuators, thermostats, device controllers, etc., to allow precision in heating timing, location, and/or temperature of the various components of apparatus 300. For example, the particles 200 may be maintained at a temperature of from 700° C. to 1200° C. immediately prior to and/or while passing by multi-phase fluid application device 100.

In some embodiments, apparatus 300 may include additional and/or alternative multi-phase fluid application devices positioned at a variety of distances from, oriented at a variety of aspects relative to, and/or located at a variety of latitudes or longitudes and/or locations along direction 240 of, the plurality of particles 200.

Without being bound by theory, it is believed that apparatus 300 as described may provide improved devices and methods for conversion of petroleum residua (e.g., commercial resid steam cracking). For example, an atomized stream of resid (e.g., stream 115) may be thermally cracked upon contact with heated cracking particles (e.g., plurality of particle 200). It is believed that pyrolysis, rather than catalysis, promotes the cracking. Therefore, more uniform distribution of atomized resid on the surface of the cracking particles may provide more consistent and/or rapid conversion. The heat capacity of the material used for the cracking particles may play a major role in a cracking process as compared to the catalytic properties of the cracking particles during the cracking process. Moreover, the apparatus may be configured so that the size of the atomized resid droplets corresponds to the size of the cracking particles. It is believed that too large of droplet diameter (relative to particle diameter) may lead to agglomeration of resid on the cracking particles, reducing the effectiveness of thermal transfer. For example, a cracking particle may have a diameter of from 50 microns to 150 microns. To avoid agglomeration, the droplets may be smaller by a factor of from 2 to 10, having diameters of from 5 microns to 75 microns.

Embodiments disclosed herein provide apparatuses and processes for conversion of petroleum resid fluids through atomization and pyrolysis. Disclosed devices and methods facilitate improvements to conversion of petroleum resid fluids over conventional technology. For example, a disclosed atomization apparatus facilitates delivery of resid feedstock by reducing bogging and/or feed inlet fouling. Some embodiments may avoid fouling by having a high diluent ratio, and/or by heating the resid feedstock to a temperature that provides a low stickiness factor. Some embodiments may deliver the atomized resid to heated particle surfaces for thermalized conversion. Some embodiments may facilitate the thermalized conversion by controlling parameters related to interaction between the resid spray and the particles (such as particle size, shape, velocity, rotation, and/or temperature, and resid spray volume, flux, and geometry).

While the present disclosure has been described with respect to a number of embodiments and examples, those skilled in the art, having benefit of this disclosure, will appreciate that other embodiments can be devised which do not depart from the scope and spirit of the present disclosure.

The invention claimed is:

1. A method comprising:
delivering heated resid fluid to a nozzle through a first conduit, and also delivering diluent fluid to the nozzle through a second conduit;
generating a stream of heated atomized resid fluid through the nozzle, which is a two-phase nozzle, a three-phase nozzle, or a capillary nozzle, wherein the stream comprises droplets independently having a diameter from 3 µm to 50 µm; and
delivering the stream to a plurality of cracking particles having a diameter of from 40 µm to 400 µm, wherein the plurality of cracking particles have a temperature from 700° C. to 1200° C. when the stream is delivered, wherein the droplets are smaller than the cracking particles by a factor of from 2 to 10.

2. The method of claim 1, wherein the nozzle has a nozzle temperature of from 700° C. to 1000° C. while the heated resid fluid and the diluent fluid are delivered to the nozzle.

3. The method of claim 1, wherein the heated resid fluid has a temperature of from 50° C. to 300° C. when delivered to the nozzle.

4. The method of claim 1, wherein the heated resid fluid comprises asphaltene or ash content from 500 ppm to 30 wt %.

5. The method of claim 1, wherein the heated resid fluid comprises hydrocarbons having a Conradson carbon residue from 1% to 20%.

6. The method of claim 1, wherein the cracking particles move translationally relative to the nozzle while the stream is delivered to the cracking particles.

7. The method of claim 6, wherein the stream is at an angle of from 0° to 90° relative to a line that is normal to the translational motion of the cracking particles.

8. The method of claim 6, wherein each cracking particle has a residence time in the stream from 10 msec to 500 msec.

9. The method of claim 1, wherein the nozzle is from −0.5 cm to 10 cm from the cracking particles.

10. The method of claim 1, wherein at least one of:
at least some of the cracking particles are spherical; and
at least some of the cracking particles comprise a ceramic.

11. The method of claim 1, comprising reducing bogging or fouling when delivering the heated residual fluid at least by:
delivering the heated resid fluid with a temperature to reduce a stickiness factor, wherein the temperature of the heated resid fluid is at least 50° C. when delivered to the nozzle, and the temperature of the heated resid fluid is increased in the nozzle having a nozzle temperature of at least 700° C.; and
providing the diluent fluid and the heated resid fluid with a diluent-to-hydrocarbon weight ratio of 0.3 to 1.0.

12. The method of claim 1, comprising vaporizing the stream of heated atomized resid fluid using heat energy present in the heated atomized resid fluid and heat energy present in the plurality of cracking particles to convert the heated atomized resid fluid into one or more cracked products.

13. The method of claim 1, comprising thermally cracking the stream via pyrolysis, without catalysis, upon delivering the stream to the plurality of cracking particles.

14. The method of claim 1, wherein the stream of heated atomized resid fluid comprises one or more contaminants or compounds that cause deactivation of cracking catalysts.

15. The method of claim 1, wherein the nozzle is from −0.5 cm to 0.5 cm from the cracking particles.

* * * * *